Jan. 26, 1960 — T. R. SCHULZ — 2,922,500
SLACK ADJUSTER
Filed Dec. 13, 1956 — 4 Sheets-Sheet 1

Inventor:
Theodore R. Schulz
By Wilmer Mechlin
his Attorney

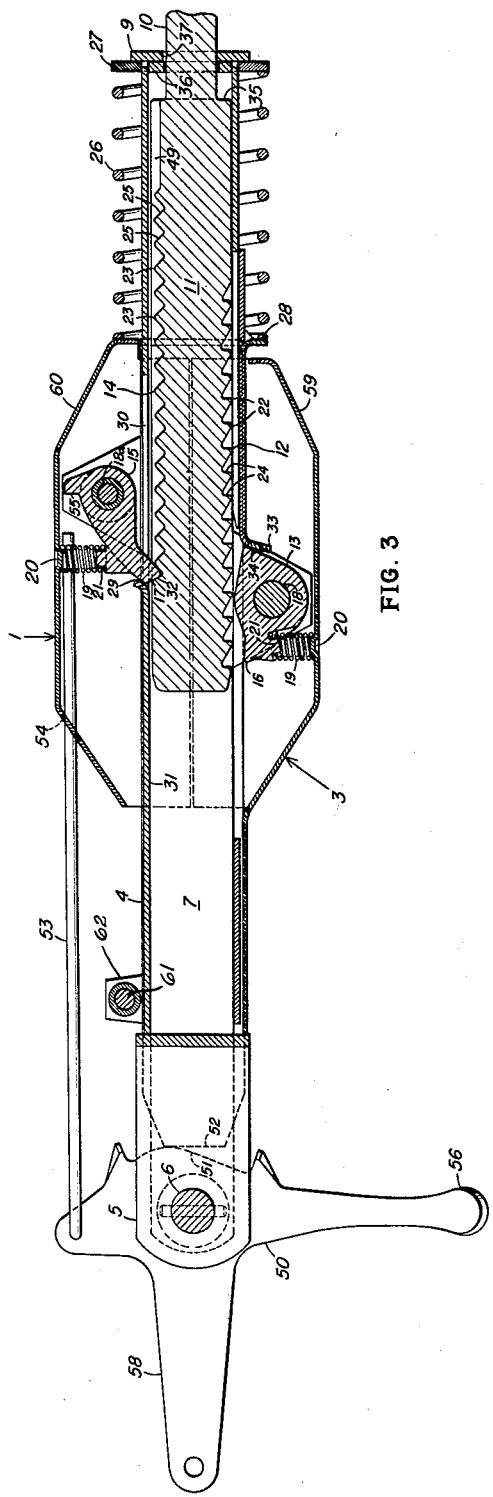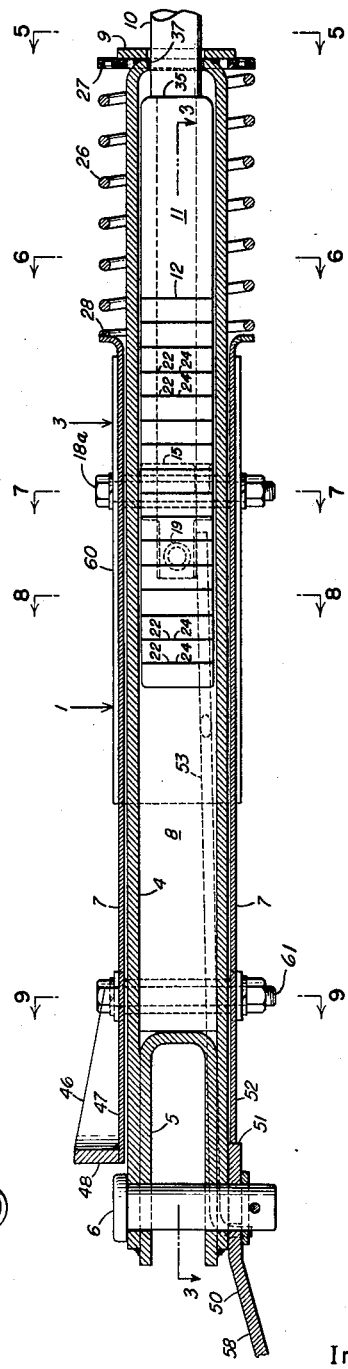

Jan. 26, 1960 T. R. SCHULZ 2,922,500
SLACK ADJUSTER
Filed Dec. 13, 1956 4 Sheets-Sheet 3

Inventor:
Theodore R. Schulz
By Wilmer Mecklin
his Attorney

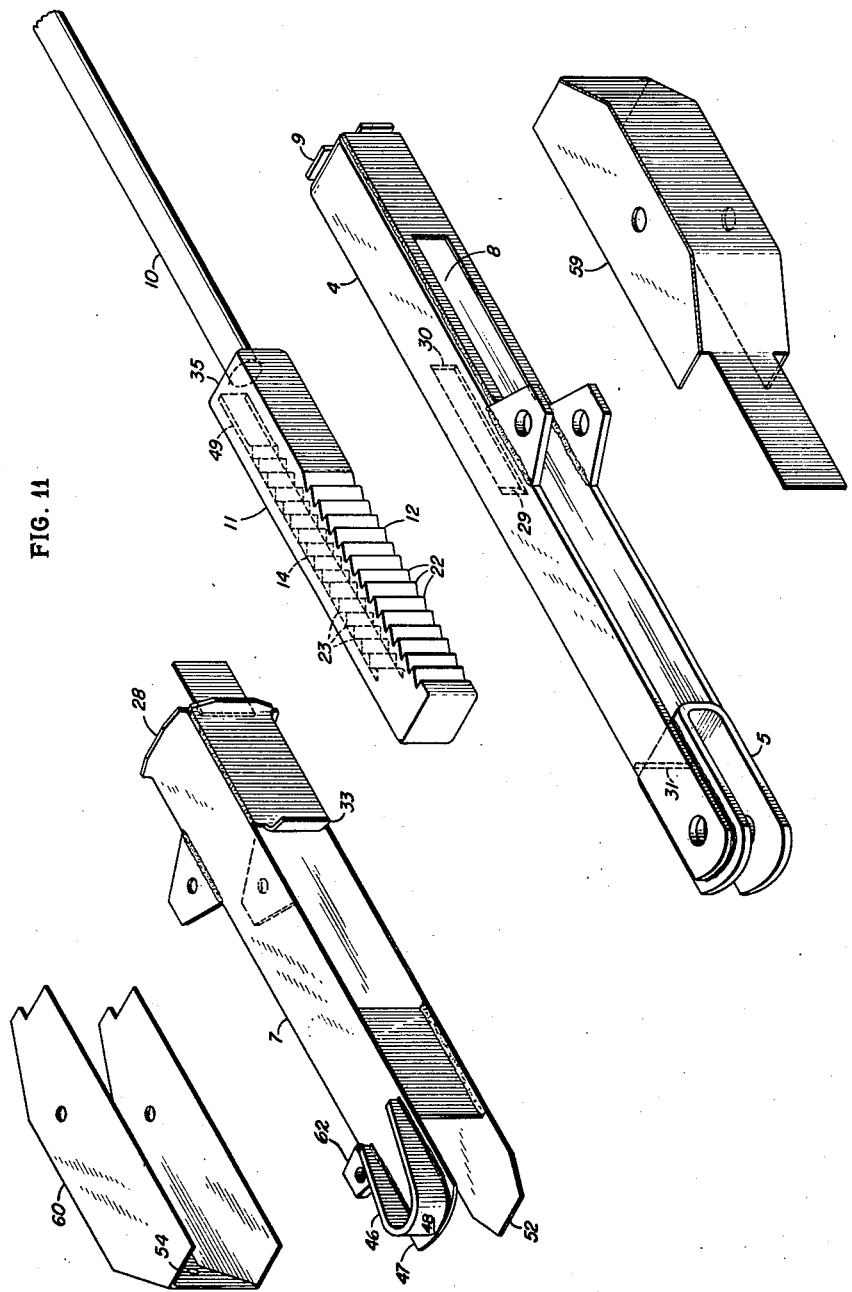

United States Patent Office
2,922,500
Patented Jan. 26, 1960

2,922,500
SLACK ADJUSTER

Theodore R. Schulz, Prospect Heights, Ill., assignor to Symington Wayne Corporation, a corporation of Maryland Application December 13, 1956, Serial No. 628,133

14 Claims. (Cl. 188—200)

This invention relates to slack adjusters for adjusting slack in the brake rigging of a railway vehicle and has for its primary object the provision of an improved double-acting slack adjuster for automatically taking up and paying out slack so as to maintain normal brake shoe clearance.

Another object of the invention is to provide an improved double-acting slack adjuster which is relatively simple and rugged in construction, positive in action and, while automatically taking up or paying off slack, is immune from false take-up or pay-out under service shocks.

An additional object of the invention is to provide an improved automatic double-acting slack adjuster having a manual release for paying off slack in the absence of brake cylinder pressure in cases in which the normal slack in the brake rigging is insufficient for the necessary repairs, as when installing a complete set of new brake shoes.

A further object of the invention is to provide an improved double-acting slack adjuster which may be connected between a pair of brake levers in place of the usual connecting rod and through actuating means associated with one of the connected brake levers automatically compensates for any increases in the slack of the brake rigging which otherwise would vary the normal throw of the applying piston and thus the brake shoe clearance.

A further object of the invention is to provide an improved automatic double-acting slack adjuster which compensates for variations in the slack of the brake rigging by movement of a plural-ratcheted rack bar coacting with and shiftable relative to a pair of pawls, the parts being of such rugged construction and positive operation as to avoid the need for a sealed housing.

Other objects and advantages of the invention will appear hereinafter in the detailed description, be particularly pointed out in the appended claims and be illustrated in the accompanying drawings, in which:

Figure 3 is a vertical sectional view on an enlarged scale of the slack adjuster of Figure 1 taken along the lines 3—3 of Figure 4;

Figure 4 is a side elevational view of the slack adjuster of Figure 3 with portions broken away and shown in section to more clearly illustrate certain of the details of construction;

Figure 11 is a somewhat exploded view showing isometrically the rack bar and multi-part casing of the slack adjuster of the preceding figures.

Figures 1, 2:
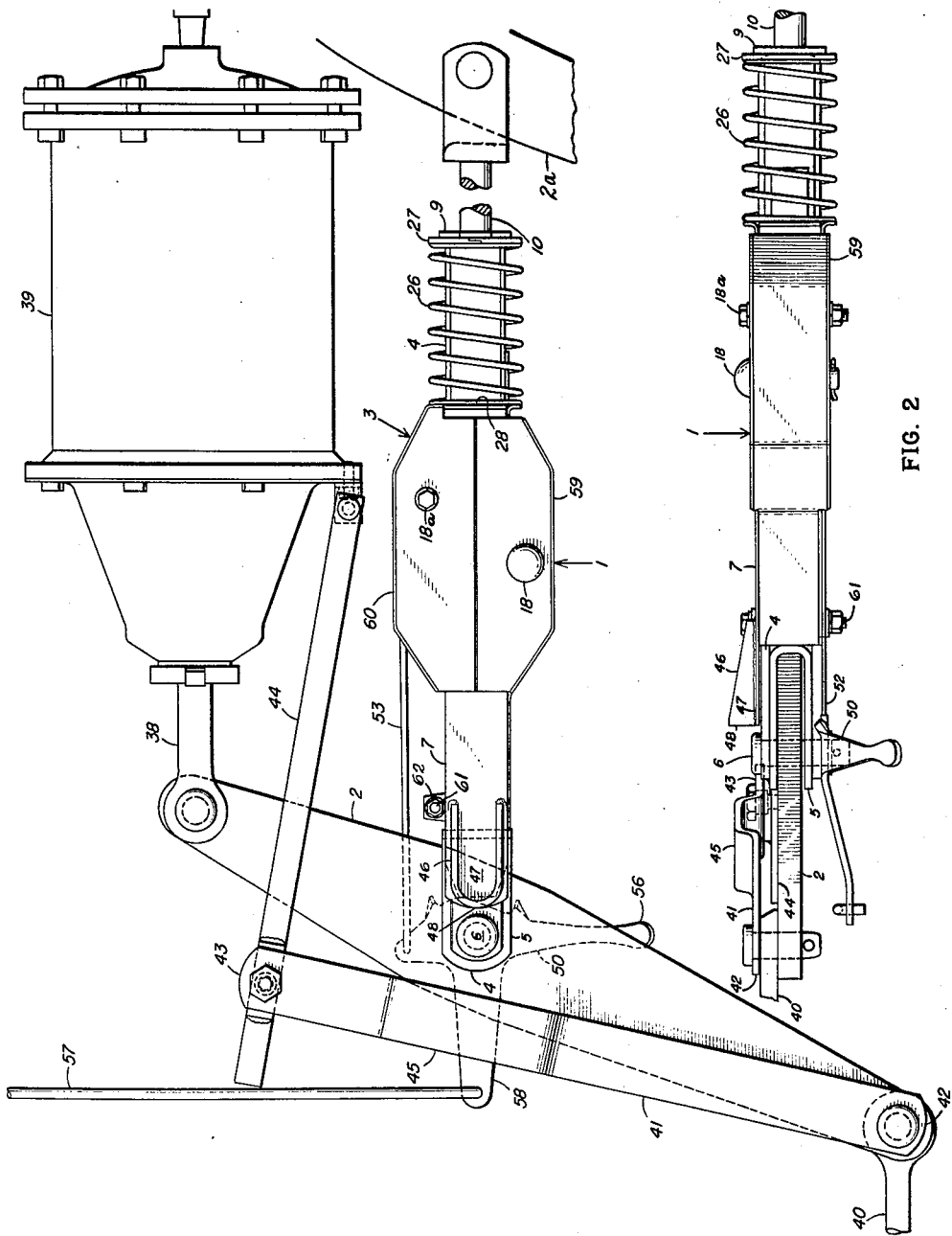
Figure 1 is a plan view of a portion of the brake rigging of a railway car to which a preferred embodiment of the slack adjuster of the present invention has been applied.
Figure 2 is a side elevational view of the structure of Figure 1.
Figure 5:
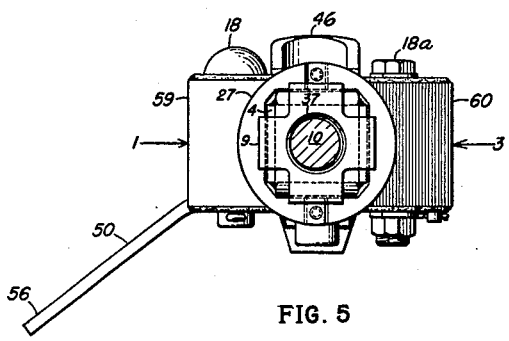
Figure 5 is a vertical sectional view taken along the lines 5—5 of Figure 4.
Figure 6:
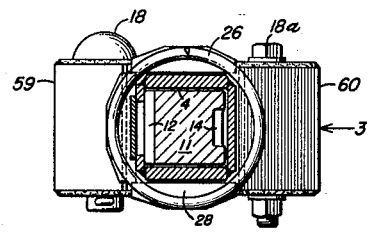
Figure 6 is a vertical sectional view taken along the lines 6—6 of Figure 4.
Figure 7:
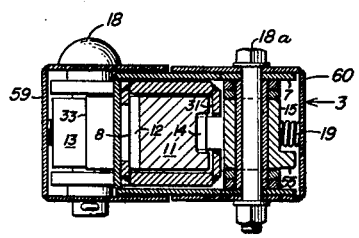
Figure 7 is a vertical sectional view taken along the lines 7—7 of Figure 4.
Figure 8:
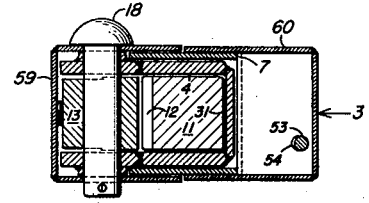
Figure 8 is a vertical sectional view taken along the lines 8—8 of Figure 4.
Figure 9:
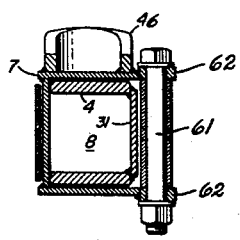
Figure 9 is a vertical sectional view taken along the lines 9—9 of Figure 4.
Figure 10:
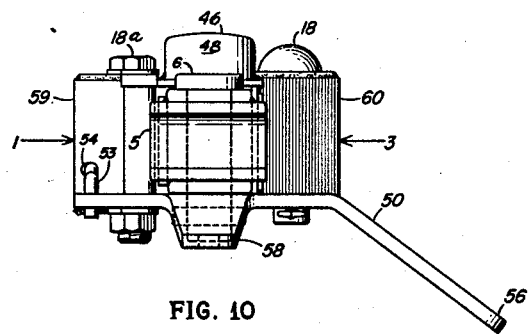
Figure 10 is an end elevational view of the slack adjuster of Figure 4 taken from the end opposite that of Figure 5.

Referring now in detail to the drawings, in which like reference characters designate like parts, the improved automatic double-acting slack adjuster of the present invention, designated generally as 1, is adapted to be installed in the brake rigging of a railway vehicle intermediate the brake cylinder and shoes as a connection between a pair of brake levers in place of a conventional connecting rod and when so installed, automatically to take up or pay out slack as needed to maintain the brake piston travel between the full released and applied positions of the brake shoes within the limits of 7 inches to 9 inches prescribed by the A.A.R.

As do automatic slack adjusters generally, that of the present invention provides a connection of adjustable length between a pair of brake levers and, not unlike some previous slack adjusters, utilizes a housing connected to one of the levers and telescopingly receiving a rod connected to the other lever with the adjustment in length obtained by a ratchet and pawl arrangement. However, previous slack adjusters of the pawl and ratchet type have been automatic only in taking up slack and required manual release for paying off slack, as after the application of new brake shoes. By contrast, by use of an arrangement of ratchets and pawls by which the rod is released under a predetermined force to increase the length of the connection and thus pay off the slack, the present slack adjuster is made automatic in paying off, as well as in taking up, slack.

Installed for purposes of illustration in place of the usual center tie or connecting rod between a brake cylinder lever 2 and an auxiliary brake lever 2a, which usually will be a dead lever deaded at one end to the car body (not shown), the slack adjuster 1 is comprised of a casing 3 formed of a main housing 4 pivotally connected at one end to an intermediate portion of the cylinder lever 2 as by a clevis 5 integral or rigid with the housing and a pivot pin 6.

Alos forming part of the casing 3 is an adjusting housing 7 which is mounted on or carried by and slidable, shiftable or reciprocable longitudinally relative to the main housing 4, the adjusting housing in the illustrated embodiment straddling or embracing the main housing 4 so as to be guided thereby in its relative longitudinal movement. The main housing 4, in its hollow interior 8, telescopingly receives, through its outer end 9 opposite that carrying the clevis 5, a connecting rod, bar or like non-rotatable power transmitting means or link 10, the outer end of which, beyond the main housing, is pivotally connected to a dead or other auxiliary brake lever 2a.

Slidable or reciprocable longitudinally within the main housing 4 and integral or rigid with or otherwise connected to the connecting rod 10, so as to move therewith under tension, is a rack bar or ratch 11 carrying a plurality of ratchets or sets of ratchet teeth, one, a main ratchet 12, adapted to be engaged by a pawl, detent or dog 13 pivoted to the main housing 4 and the other, an adjusting ratchet 14, engageable with an adjusting pawl, detent or dog 15 carried by and pivoted to the adjusting housing 7. So as to prevent interference in their actions, the main and adjusting ratchets 12 and 14 are spaced about or transversely of the rack bar 11 and, as in the illustrated embodiment, conveniently may be formed on opposite faces of the rack bar with the associated pawls 13 and 15 correspondingly positioned. Designed to oppose movement of the rack bar 11, outwardly relative to the main housing 4, the main and adjusting pawls 13 and 15 have their ratchet-engaging noses 16 and 17 respectively disposed inwardly of their axes 18 and 18a, respectively, toward the cylinder lever 2 and each is yieldably urged into engagement with its ratchet by a coil or like spring 19, each of the latter preferably acting transversely of the rack bar 11 between a spring seat 20 on each of the main and adjusting housings 4 and 7 and an opposing seat 21 on the associated of the pawls 13 and 15.

It will be noted that the noses 16 and 17 of the main and adjusting pawls 13 and 15, respectively, are relatively sharp and blunt and that the teeth 22 and 23 of the main and adjusting ratchets 12 and 14, respectively, also are of different configuration. Thus, the teeth 22 of the main pawl and ratchet have their substantially flat or planar holding faces or outwardly facing sides 24 disposed transversely and substantially normal or perpendicular to the longitudinal axes of the rack bar so as to lock the latter against outward movement when any of the teeth 22 is engaged by the main pawl 13. By contrast, the holding faces or outwardly facing sides 25 of the teeth 23 of the adjusting ratchet 14 slant, slope or are inclined towards the inner end of the rack bar so that while resisting outward movement of the connecting rod 10 relative to the main housing 4, the adjusting pawl 15, if the longitudinal force is sufficient, may be cammed over or disengaged from successive teeth 23 of the adjusting ratchet 14 so as progressively to pay or let out the connecting rod 10 from the main housing 4.

The adjusting housing 7 normally is urged toward the cylinder lever 2 by a main spring 26, acting longitudinally between the main and adjusting housings 4 and 7 and preferably in the form of a coil spring encircling the main housing 4 and acting between a collar or washer 27 at the outer end 9 of the main housing and a confronting flat face 28 on the adjusting housing. When in its normal position shown in Figure 3, the adjusting pawl 15, under force of the main spring 26 on the adjusting housing 7, is held against the inner or front edge 29 of a longitudinally elongated slot 30 in a wall 31 of the main housing 4, this not only serving to limit the movement of the adjusting housing 7 in that direction relative to the main housing but also adding to the force of its transverse spring 19 that of the main spring 26 in holding the nose 17 of the adjusting pawl 15 in engagement with the aligned of the teeth 23 in the adjusting ratchet 14, this action of the main spring preferably being further enhanced by forming the front edge 29 of the slot 30 in the main housing 4 as an upslanting lip overriding and engaging an upper or cam face 32 on the nose 17 so as to prevent false take-up or let-out by jumping of the adjusting pawl under service shocks.

As opposed to the adjusting pawl 15, the main pawl 13, in its normal position shown in Figure 3, has its nose 16 disengaged from the main ratchet 12 by a disengaging or releasing finger or member 33 actuated by or, as in the illustrated embodiment, integral with the adjusting housing 7, this releasing finger, as the main spring 26 urges the adjusting housing toward normal position, engaging a confronting rear or outer cam surface or shoulder 34 on the main pawl 13 and rotating or turning the latter to disengaged position.

When the adjusting housing 7 is shifted from its normal position by a force opposing the main spring 26, first the nose 17 of the adjusting pawl 15 is moved from under the overhanging lip 29 on the main housing, so as to be held against disengagement only by its transverse spring 19 and, thereafter, the main pawl 13 is released fully by the releasing finger 33 on the adjusting housing and freed to rotate into engagement with its ratchet, these actions occurring in the disclosed embodiment on a travel of some 7/16 of an inch of the adjusting housing 7 outwardly of the main housing 4.

While of no consequence in the ordinary operation of the slack adjuster, it will be perceived that provision is made for limiting the outward movement of the rack bar 11 relative to the main housing 4 so as to fix the maximum length of the connection between the connected pair of brake levers should the adjusting pawl fail. This, in the disclosed embodiment, is provided for by making the connecting rod 10 of reduced cross-section relative to the rack bar 11, so as to provide a shoulder 35 on the latter engageable with an end wall 36 which partly closes the outer end 9 of the main housing and through an opening 37 in which the connecting rod 10 extends.

For automatically taking up slack, the slack adjuster 1, in addition to the above structure, needs means for shifting the adjusting housing 7, as the brakes are applied, a distance corresponding to the slack needed to be taken up while holding the rack bar 11 against outward movement by the main pawl 13 and on release of the brakes, utilizing the force of the main spring 26 to shift the rack bar a corresponding distance inwardly of the main housing. With the main housing 4 pivotally connected to an intermediate portion of the brake cylinder lever 2, as in the illustrated embodiment, and the cylinder lever in the usual manner pivotally connected at one end to the piston or push rod 38 of the brake cylinder 39 and at the other to a link, here a pull rod 40, connecting it to the portion of the brake rigging at one end of the railway car (not shown), the actuating means for shifting the adjusting housing 7 to take up excess slack may be in the form of an actuating or adjusting lever 41 pivoted at its lower end 42 to the end of the cylinder lever 2 connected to the pull rod 40 and at its opposite end 43 to a radius rod 44 pivoting about a point fixed relative to the brake cylinder 39, as by pivotally mounting it on the brake cylinder. Swinging thus in a plane parallel to that of the cylinder lever 2, the adjusting lever 41 has an intermediate portion 45 offset so as to clear the clevis 5 and pivot pin 6 at the inner end of the main housing 4.

Using such an adjusting lever 41 and disposing in the path of its offset portion 45 a bracket, roller or other contact element 46 carried by and movable longitudinally with the adjusting housing 7, as by mounting it on a forward extension 47 of that housing, it is a simple matter to provide for contact between the adjusting lever 41 and the contact member 46 on a predetermined travel of the push rod 38 and for the adjusting lever thereafter to shift the adjusting housing 7 away from the cylinder lever 2 in correspondence with further travel of the piston rod 38.

If, as in the illustrated embodiment, the normal slack for which the slack adjuster is set is taken as the lower limit of the A.A.R. range, or 7 inches, the construction and arrangement of the coacting parts may be such that the contact element 46, here in the form of a U-shaped bracket having an arcuately convex end 48 confronting the adjusting lever 41, will be contacted by the adjusting lever when the piston rod 38 has traveled some 6¼ inches. Then, as the piston continues to travel, the adjusting housing 7 will be shifted outwardly relative to the main housing 4 in succession releasing the adjusting pawl 15 from the lip 29 on the main housing and engaging the main pawl 13 with the laterally aligned of the teeth 22 of the main ratchet 12. If the slack in the brake rigging is then normal, the adjusting pawl will start to ride over the succeeding of the teeth 23 on the adjusting ratchet 14 but the brakes will have been applied before it can ride over that tooth and, on release of the brakes, the main spring 26 will restore the parts of the slack adjuster to their initial position. However, if the slack is excessive, the outward shift of the adjusting housing 7 will continue and the adjusting pawl will ride over successive of the teeth 23 until the excess slack has been taken up. On subsequent release of the brakes, the main spring 26, acting through the adjusting housing 7 and the adjusting pawl 15, and with the latter engaging the holding face 25 of the last of the teeth 23 over which it rode, will shift the adjusting pawl and therewith the rack bar 11 inwardly, in process causing the main pawl 13 to ride over a corresponding number of the teeth 22 in the main ratchet 12, until the adjusting housing has been returned to its normal position as shown in Figure 3. As further wear occurs, additional slack will be taken up automatically in the same manner until the limit of the take-up of the slack adjuster is reached, at which point the adjusting pawl will merely slide in the toothless key-way 49 at the outer end of the adjusting ratchet 14. This automatic take-up will occur not only on wear in the brake rigging but when there is excessive slack for any cause, as when one or more brake shoes are lost, the illustrated adjuster being capable of taking up the excess slack and enabling the brakes to be operated when as many as three shoes have been lost.

When the slack in the brake rigging is either normal or excessive, the load is transferred to and carried during a brake application by the main pawl 13, due to the shifting of the adjusting housing 7 by the adjusting lever 41 in the manner above described. However, when the slack is below normal, the travel of the brake piston rod 38 to the point at which the brake shoes (not shown) are fully applied, will be insufficient to cause the adjusting housing to be shifted by the adjusting lever and the automatic let-out action of the slack adjuster will come into play. With the rack bar then held against shifting outwardly of the main housing 4 only by the adjusting pawl 15, continued application of fluid pressure on the brake piston (not shown) after the shoes are applied exerts a force tending to lengthen the slack adjuster 1 and this, in turn, enables the rack bar 11 through its engagement with the adjusting pawl 15, to shift the adjusting housing 7 away from the cylinder lever 2 relative to the main housing 4 sufficiently to release or unlock the adjusting pawl from the lip 29 on the main housing so that the adjusting pawl is then held in engagement with the holding face 25 of the aligned of the teeth 23 of the adjusting ratchet 14 only by the force of its own coil spring 19. This release of the adjusting pawl 15 occurring before the main pawl 13 has been released by the disengaging or releasing finger 33 so as to engage the main ratchet 12, it is only necessary that the slope of the holding faces 25 of the teeth 23 of the adjusting ratchet 14 and the force exerted on the adjusting pawl by the transversely acting coil spring 19 be such that the longitudinal force required to cam the adjusting pawl out of engagement with the aligned tooth, when the pawl is freed of the lip 29 is less than that required to compress the main spring 26 for the continued application of force on the brake piston to cause the adjusting pawl to ride over successive teeth and pay out the connecting rod 10 from the main housing 4 to the extent needed to restore the slack in the brake rigging to normal without displacing the adjusting housing sufficiently to bring the main pawl 13 into play. The limit of such automatic paying out of slack, of course, is predetermined by the normal slack for which the slack adjuster is set, since by the time this is reached, the adjusting lever 41 will have been brought into action and, by shifting the adjusting housing 7 sufficiently, will have caused the main pawl 13 to engage its ratchet 12 and lock the rack bar 11 and connecting rod against further outward movement relative to the main housing 4.

The slack adjuster will automatically pay out slack in the above manner if reduced below normal, as by the application of new brake shoes. However, the one limitation on such automatic adjustment is that if, prior to the installation of the new shoes, the slack is at the normal 7 inches, there will be sufficient clearance only for the installation of three new shoes and the shoes, for automatic adjustment, must be installed three at a time with the slack increased to normal between each installation by application of the brakes. Alternatively, and also when more than three shoes are to be applied and braking pressure is not available, as will often be the case when a car is undergoing repair, slack may be paid out manually. This is accomplished in the illustrated embodiment by a release lever 50 pivotally mounted on the main housing 4, conveniently by the pivot pin 6 attaching the main housing to the cylinder lever 2. The release lever 50 has a cam face 51 engaging an end of a forward extension 52 on the adjusting housing 7 paralleling that, 47, carrying the contact element 46 and is pivotally connected to one end of a release rod 53, the other end of which extends through a guide opening 54 in the adjusting housing 7 and is aligned to engage a lug 55 on the adjusting pawl 15. On manual rotation of the release lever 50 by its handle 56, the adjusting housing 7, by the camming action of the cam face 51 against the end of the forward extension 52 on the adjusting housing, will shift the latter to unlock the adjusting pawl 15 and thereafter, by engagement of the release rod 53 with the lug 55, rotate the adjusting pawl out of engagement with the adjusting ratchet, thus freeing the rack bar 11 and permitting the slack adjuster, by pulling on the handle 56, to be lengthened to the extent necessary. If desired, such manual release may be accomplished from a side of the car through an actuating rod 57 extending thereto and pivotally connected at its inner end to an arm 58 on the release lever 50. It is not necessary at this juncture manually to set the slack of the brake rigging at normal, since the slack adjuster will automatically accomplish this by taking up or paying off slack as necessary on application of the brakes.

In the foregoing discussion, no particular mention has been made of the construction of the casing 3, it being evident that its several components may be cast or otherwise constructed in a suitable manner. However, the illustrated casing does have the advantage of inexpensiveness of manufacture, with its main and adjusting housings 4 and 7 built up of weldments and with the main and adjusting pawls 13 and 15 and corresponding ratchets 12 and 14 protected by stamped covers 59 and 60 connected to their respective housings. This construction, with its box-shaped main housing, has the further advantage, when the rack bar 11 is also of rectangular cross-section, of maintaining the pawls and ratchets in confronting relation and relieving the adjusting pawl 15 of that function. Open-topped inwardly of its cover 60, the built-up adjusting housing 7 of this form is supported on the main housing 4, adjacent the connection of the latter to the brake lever 2, by a cross bolt 61 riding on the main housing and extending through apertured ears 62 upstanding from opposite sides of the adjusting housing.

From the above detailed description, it will be apparent that there has been provided an improved automatic double-acting slack adjuster which is of simple and rugged construction and effective to take up and pay out slack as needed to restore the slack in the brake rigging to normal. It should be understood that the described and disclosed embodiment is merely exemplary of the invention and that all modifications are intended to be included which do not depart from either the spirit of the invention or the scope of the appended claims.

I claim:

1. In railway brake rigging, the combination with a pair of brake levers, of an automatic slack adjuster comprising a main housing pivotally connected to one of said levers, a rack bar connected for relative longitudinal movement to said housing and pivotally connected to said other lever, an adjusting housing shiftable longitudinally on said main housing, resilient means acting between said housings for yieldably resisting outward movement of said adjusting housing relative to said main housing, a plurality of ratchets on said rack bar, a main pawl carried by said main housing and engageable with one of said ratchets for locking said rack bar against outward movement relative thereto, and adjusting pawl carried by said adjusting housing and engaging another of said ratchets, means shiftable with said adjusting housing for normally holding said main pawl disengaged from said one ratchet, and means associated with said one lever and effective on a brake application for shifting said adjusting housing outwardly relative to said main housing and therethrough releasing said main pawl from said holding means for engagement with said one ratchet, said resilient means on subsequent release of brakes acting through said adjusting pawl for shifting said rack bar inwardly relative to said housing.

2. In railway brake rigging, the combination with a brake piston and a pair of brake levers, of an automatic slack adjuster comprising a housing pivotally connected to one of said levers, adjusting means shiftable longitudinally on said housing, resilient means acting between said housing and adjusting means for yieldably resisting relative outward movement of said adjusting means, means movable longitudinally relative to said housing and connected to the other of said levers, means carried by said adjusting means and yieldably engaging said movable means for resisting movement of said movable means in either longitudinal direction relative to said adjusting means, locking means carried by said housing and normally disengaged from said movable means and engageable therewith for locking said movable means against outward movement relative to said housing, and means effective on a predetermined travel of said brake piston for locking said movable means against said outward movement by engagement therewith of said locking means and shifting said adjusting means and said engaging means carried thereby outwardly of said housing, said resilient means on subsequent release of brakes acting between said housing and adjusting means for restoring said adjusting means to initial position and through the engaging means carried thereby shifting said movable means inwardly of said housing.

3. In railway brake rigging, the combination with a brake piston and a pair of brake levers, of an automatic slack adjuster comprising a housing connected to one of said levers, a rack bar in and movable longitudinally relative to said housing, means connecting said rack bar and other lever, a plurality of ratchets on said rack bar, a pawl carried by said housing and normally disengaged from one of said ratchets and engageable therewith for locking said rack bar against movement in one direction relative to said housing, a pawl engaging another of said ratchets and shiftable longitudinally relative to said housing and rack bar, means yieldably resisting movement of said second-named pawl in one longitudinal direction relative to said housing and in either longitudinal direction relative to said rack bar, and means effective on a predetermined travel of said brake piston for engaging said housing-carried pawl with said one ratchet and shifting said shiftable pawl in said one direction relative to said housing and rack bar.

4. In railway brake rigging, the combination with a brake piston and a pair of brake levers, of an automatic slack adjuster comprising a housing pivotally connected to one of said levers, a rack bar connected for relative longitudinal sliding movement to said housing, means connecting said rack bar and other lever, a plurality of ratchets on said rack bar, a pawl engaging one of said ratchets and shiftable against yieldable resistance in one longitudinal direction relative to said housing and in either longitudinal direction relative to said rack bar, a pawl carried by said housing and normally disengaged from another of said ratchets and engageable therewith for locking said rack bar against longitudinal movement in said one direction relative to said housing, and means effective on a predetermined travel of said brake piston for locking said rack bar against movement in said one direction longitudinally of said housing by engagement of said second-named pawl therewith, whereby said slack adjuster on a brake application requiring less than said predetermined travel of said brake piston will pay out slack by moving said rack bar against the resistance of said shiftable pawl and on an application requiring more than said predetermined travel will take up slack on subsequent release of brakes through engagement of said shiftable pawl and associated ratchet.

5. In railway brake rigging, the combination with a brake piston and a pair of brake levers, of an automatic slack adjuster comprising a housing pivotally connected to one of said levers, power transmitting means in and slidable longitudinally relative to said housing, means connecting said power means and other lever, means carried by said housing and normally disengaged from said power means and engageable therewith for locking said power means against movement in one longitudinal direction relative to said housing, means effective on a predetermined travel of said brake piston for locking said power means against said relative movement in said one longitudinal direction by engagement therewith of said locking means, adjusting means shiftable longitudinally relative to said housing and yieldably engaging said power means for resisting relative movement therebetween in either longitudinal direction, and yieldable means acting between said housing and adjusting means for resisting shifting of said adjusting means in one direction relative to said housing, whereby on a brake application requiring less than said predetermined travel of said brake piston slack is paid out by shifting of said power means against the resistance of said adjusting means and on an application requiring more than said predetermined travel said power means is locked against outward movement by said housing-carried means while said shiftable means is shifted relative to said power means against the force of said yieldable means, said yieldable means on subsequent release of brakes acting through said adjusting means for shifting said power means inwardly relative to said housing.

6. In railway brake rigging, the combination with a brake piston and a pair of brake levers, of an automatic slack adjuster comprising a housing connected to one of said levers, a rack bar in and slidable longitudinally relative to said housing, means connecting said rack bar and other lever, a ratchet on said rack bar, a pawl shiftable longitudinally relative to said housing and engaging said ratchet, means yieldably opposing shifting of said pawl in one longitudinal direction relative to said housing, means normally disengaged from said rack bar and engageable therewith for locking said rack bar against longitudinal movement in one direction relative to said housing, and means effective only on a predetermined travel of said brake piston and acting through said locking means for locking said rack bar against longitudinal movement in said one direction relative to said housing while shifting said pawl in the same direction relative thereto, said yieldably opposing means on subsequent release of brakes acting through said pawl on said rack bar for taking up excess slack in said rigging.

7. In railway brake rigging, the combination with a brake piston and a pair of brake levers, of an automatic slack adjuster comprising a housing connected to one of said levers, non-rotatable power transmitting means connected to said other lever and movable longitudinally relative to said housing, means carried by and fixed against longitudinal movement relative to said housing, said housing-carried means being normally disengaged from said power means, and selectively engageable therewith for locking said power means, in any of a plurality of positions against movement in one direction longitudinally of said housing, adjusting means carried by and shiftable longitudinally relative to said housing and engaging said power means, means responsive to travel of said brake piston beyond a predetermined point for engaging said locking means with said power means and shifting said adjusting means in said one direction relative to said housing, and yieldable means acting on and opposing shifting of said adjusting means in said one direction.

8. In railway brake rigging, the combination with a pair of brake levers, of an automatic slack adjuster comprising a housing connected to one of said levers, non-rotatable power transmitting means connected to said other lever and slidable longitudinally relative to said housing, a plurality of ratchet means on said power means, pawl means carried by and fixed against longitudinal movement relative to said housing and engageable with one of said ratchet means for locking said power means against movement outwardly of said housing, pawl means carried by said housing and engaging another of said ratchet means and reciprocable relative to said housing and power means, means including yieldable means acting on and normally holding said second-named pawl means against movement relative to said housing and power means, and means reciprocable with said second-named pawl means for disengaging said first-named pawl means from said one ratchet means when said second-named pawl means is in normal position.

9. In railway brake rigging, the combination with a pair of brake levers, of an automatic slack adjuster comprising a housing connected to one of said levers, non-rotatable power transmitting means connected to said other lever and slidable longitudinally relative to said housing, a plurality of ratchet means on said power means, pawl means carried by and fixed against longitudinal movement relative to said housing and normally disengaged from one of said ratchet means and engageable therewith for locking said power means against movement outwardly of said housing, pawl means carried by said housing and engaging another of said ratchet means and reciprocable relative to said housing and power means, means including yieldable means acting on and normally holding said second-named pawl means against movement relative to said housing and power means, and means effective on a predetermined travel of said piston for shifting said second-named pawl means longitudinally relative to said power means while said power means is locked against outward movement relative to said housing by said first-named pawl means.

10. In railway brake rigging, the combination with a brake piston and a pair of brake levers, of an automatic slack adjuster comprising a housing connected to one of said levers, non-rotatable power transmitting means connected to said other lever and slidable longitudinally relative to said housing, a plurality of ratchet means on said power means, pawl means carried by and fixed against longitudinal movement relative to said housing and normally disengaged from one of said ratchet means and engageable therewith for locking said power means against movement outwardly of said housing, pawl means carried by said housing and engaging another of said ratchet means and reciprocable relative to said housing and power means, means including yieldable means acting on and normally holding said second-named pawl means against movement relative to said housing and power means, and lever means associated with said one brake lever and effective on a predetermined travel of said piston for shifting said second-named pawl means longitudinally relative to said power means while said power means is locked against outward movement relative to said housing by said first-named pawl means.

11. In railway brake rigging, the combination with a brake piston and a pair of brake levers, of an automatic slack adjuster comprising a housing connected to one of said levers, non-rotatable power transmitting means connected to said other lever and slidable longitudinally relative to said housing, a plurality of ratchet means on said power means, pawl means carried by and fixed against longitudinal movement relative to said housing and normally disengaged from one of said ratchet means and engageable therewith for locking said power means against movement outwardly of said housing, pawl means carried by said housing and engaging another of said ratchet means and reciprocable relative to said housing and power means, means including yieldable means acting on and normally holding said second-named pawl means against movement relative to said housing and power means, and manually operable means connected to said housing and actable only on said second-named pawl means for releasing said second-named pawl means from said other ratchet means and permitting movement of said power means outwardly of said housing.

12. In brake rigging for a railway car, the combination with a brake piston mounted on the body of said car and a pair of brake levers, of an automatic slack adjuster comprising a housing connected to one of said levers, non-rotatable power transmitting means connected to said other lever and slidable longitudinally relative to said housing, a plurality of ratchet means on said power means, pawl means carried by and fixed against longitudinal movement relative to said housing and engageable with one of said ratchet means for locking said power means against movement outwardly of said housing, pawl means carried by said housing and engaging another of said ratchet means and reciprocable relative to said housing and power means, means including yieldable means acting on and normally holding said second-named pawl means against movement relative to said housing and power means, and lever means connected to said one lever and car body and effective on a predetermined travel of said piston for shifting said second-named pawl means longitudinally relative to said power means while causing said power means to be locked against outward movement relative to said housing by said first-named pawl means.

13. In railway brake rigging, the combination with a brake piston and a pair of brake levers, of a housing connected to one of said levers, power transmitting means connected to said other lever and slidable longitudinally relative to said housing, a plurality of ratchets on said power means, a pawl carried by and fixed against longitudinal movement relative to said housing and engageable with one of said ratchets, a pawl shiftable longitudinally relative to said housing and engaging another of said ratchets, spring means acting against said housing for yieldably resisting movement of said second pawl in one direction relative thereto, means on said housing and engageable with said second pawl, said last-named means cooperating with said spring means for normally holding said second pawl against movement relative to said housing and power means, and means shiftable with said second pawl for disengaging said first pawl from said one ratchet when said second pawl is in normal position, said second pawl being releasable from said holding means on said housing in advance of engagement of said first pawl with said one ratchet for enabling a force tending to lengthen said slack adjuster to move said power means outwardly of said housing and pay out slack in said rigging.

14. In railway brake rigging, the combination with a brake piston and a pair of brake levers, of a housing connected to one of said levers, power transmitting means connected to said other lever and slidable longitudinally relative to said housing, a plurality of ratchets on said power means, a pawl carried by and fixed against longitudinal movement relative to said housing and engageable with one of said ratchets, a pawl shiftable longitudinally relative to said housing and engaging another of said ratchets, spring means acting against said housing for yieldably resisting movement of said second pawl in one direction relative thereto, means on said housing and engageable with said second pawl, said last-named means cooperating with said spring means for normally holding said second pawl against movement relative to said housing and power means, means shiftable with said second pawl for disengaging said first pawl from said one ratchet when said first pawl is in normal position, said second pawl being releasable from said holding means on said housing in advance of engagement of said first pawl with said one ratchet for enabling a force tending to lengthen said slack adjuster to move said power means outwardly of said housing and pay out slack in said rigging, and means effective on a predetermined travel of said brake piston in response to a brake-applying force for shifting said second pawl outwardly relative to said housing while said power means is locked against outward movement relative to said housing by engagement of said first pawl with said one ratchet, said spring means on subsequent release of said force acting to restore said second pawl to normal position and therethrough to shift said power means inwardly relative to said housing and take up slack in said rigging.

References Cited in the file of this patent

UNITED STATES PATENTS

| | | |
|---|---|---|
| 1,837,473 | Neveu | Dec. 22, 1931 |
| 2,559,779 | Martin | July 10, 1951 |
| 2,752,012 | Moorhead | June 26, 1956 |
| 2,780,324 | O'Boyle | Feb. 5, 1957 |